Patented Nov. 24, 1925.

1,562,878

UNITED STATES PATENT OFFICE.

NATHANIEL T. EWER, OF SWARTHMORE, PENNSYLVANIA, ASSIGNOR, BY MESNE ASSIGNMENTS, TO AMDYCO CORPORATION, A CORPORATION OF NEW YORK.

FOAM STABILIZER.

No Drawing. Original application filed December 18, 1923, Serial No. 681,429. Divided and this application filed September 18, 1924. Serial No. 738,557.

*To all whom it may concern:*

Be it known that I, NATHANIEL T. EWER, a citizen of the United States, residing at Swarthmore, in the county of Delaware, State of Pennsylvania, have invented certain new and useful Improvements in Foam Stabilizers; and I do hereby declare the following to be a full, clear, and exact description of the invention, such as will enable others skilled in the art to which it appertains to make and use the same.

This invention relates to foam stabilizers particularly adapted for use in solutions which, when mixed, are capable of forming foam blankets for the purpose of extinguishing fires. The invention relates more particularly to foam stabilizers produced from relatively inexpensive waste materials, and the present application is a division of my copending application, Serial No. 681,429, filed December 18, 1923.

It is to be understood that the use of foam blankets for fire-extinguishing purposes has been practiced for many years. To produce these blankets solutions capable of releasing a gas, such as carbon dioxide, and containing the stabilizer, are mixed at or adjacent to the fire and the mass of bubbles produced by the reaction is applied to the fire to shut off the supply of oxygen therefrom. The function of the stabilizer is to increase the toughness and tenacity of the foam so that it will effectively accomplish the desired result. The solutions used contain generally sodium bicarbonate and aluminum sulphate respectively, the foam stabilizer being mixed usually with the sodium bicarbonate solution.

The stabilizer heretofore commonly used in fire-extinguishing solutions for the purpose of producing foam blankets is an extract of licorice root which gives to the foam the desired toughness and tenacity and ensures the successful accomplishment of its intended purpose. Many suggestions have been made heretofore regarding the substitution of other foam stabilizers such as black liquor from the manufacture of paper pulp, glue, saponin, etc., for the extract of licorice root. The substitutes have not proved to be effective or are less satisfactory than extract of licorice root which has been employed almost exclusively as a foam stabilizer in fire-extinguishing compositions.

It is the object of the present invention to provide a foam stabilizer which is relatively inexpensive and is equal to or more effective than the extract of licorice root heretofore used.

Other objects and advantages of the invention will be apparent as it is better understood by reference to the following specification.

My research has disclosed a source of material suitable for use as a foam stabilizer having all of the desirable properties of materials heretofore suggested for that purpose and being derived preferably from a waste product so that the cost thereof is reduced to a minimum. I have discovered that certain barks when suitably extracted provide a very satisfactory foam stabilizer and that the stabilizer may be used advantageously in connection with fire-extinguishing solutions for the purpose of providing a tough and tenacious foam blanket.

Although the product may be prepared from the barks in their original condition, it is preferable to first extract the barks and thereby recover valuable products which are not useful as foam stabilizers. In fact, the barks which I employ are extracted for the purpose of producing commercial products such as dye-stuffs and tannin extracts. The residual material was, prior to my invention, considered as waste and was utilized as a low grade fuel. This waste material may be subjected to a secondary extraction under suitable conditions to separate a foam stabilizer thereform, and this extract is utilized for the purpose of the invention.

In carrying out the invention I may use various oak barks, but more particularly chestnut oak bark including the species *Quercus Muhlenbergii* of Engelmann, *Quercus Prinus* of Linnaeus and *Quercus Michauxii* of Nuttall. This bark produces, upon primary extraction with water and steam under pressure, a valuable dye-stuff which has, however, no utility as a foam stabilizer. When the extracted bark is subjected to a secondary extraction the foam stabilizer is obtained. The secondary extraction is preferably conducted with a solution of an alkali such as caustic soda. About eight per cent of caustic soda figured on the weight of the dry material is used. The extraction is carried out under a steam pressure of approximately forty-five pounds, which is maintained until the extraction is sufficiently complete; that is to say, when the specific gravity of the liquor is about 1.045 or equivalent to 9° Twaddell. Two or more hours may be required for the extraction. After the liquor is blown off from the extractor it is filtered and then evaporated, preferably in a vacuum pan, until its specific gravity is approximately 1.16 equivalent to 32° Twaddell.

The extract thus obtained is quite fluid and easily runs through a two inch opening at ordinary temperatures. It does not ferment and will prevent fermentation of substances which might otherwise undergo this change. It is, therefore, particularly desirable for use in closed containers which remain at long intervals at temperatures favorable to fermentation. The extract is readily soluble in both hot and cold water and is quickly dissolved in bicarbonate solutions such as are used in fire-extinguishing compositions. These solutions, when used with the extract, show very little if any sediment after long standing, the product being markedly superior in this respect to foam stabilizers now in the market.

In employing the extract for fire-extinguishing purposes, two solutions are used. The proportions hereinafter specified are suggestive merely as the compositions may be varied considerably.

*Solution No. 1.*

| | Per cent. |
|---|---|
| Bicarbonate of soda | 8.5 |
| Extract of chestnut oak bark | 3 |
| Water | 88.5 |

*Solution No. 2.*

| | |
|---|---|
| Aluminum sulphate | 13 |
| Water | 87 |

These solutions are maintained in separate containers until the need for the fire-extinguishing blanket occurs. The solutions are then mixed and the chemical reaction results in the production of a large volume of carbon dioxide. The latter is released in the solution and produces a mass of bubbles which, owing to the presence of the foam stabilizer, are extremely tough and tenacious. When this foam is applied to a fire oxygen from the atmosphere is prevented substantially from reaching the combustible material and the fire is extinguished promptly.

As hereinbefore noted the foam stabilizer may be obtained directly by extracting the barks mentioned with alkaline solutions. In this case the extract is contaminated to a certain extent with the valuable materials which are ordinarily extracted with water, and to that extent the yield of foam stabilizer would be somewhat reduced and its efficiency would be lowered. It is preferable, accordingly, first to subject the bark to water extraction as described and to produce the foam stabilizer by a secondary extraction. This practice will be followed usually because the extraction of dye-stuffs and tannin from the barks mentioned is an established industry and large quantities of bark which has been subjected to the primary extraction are available and can be obtained at a relatively low cost. The supply of such extracted bark is sufficient to make this material an economical and desirable source of foam stabilizer.

The foam stabilizer prepared as hereinbefore described may be utilized advantageously in liquid form. In this form it can be added to one or the other of the water solutions of the fire-extinguishing composition. It is also desirable to use the foam stabilizer in a solid form so that it can be added directly to the dry ingredients of the fire-extinguishing composition. For this purpose the liquid stabilizer can be crystallized by subjecting it to evaporation in a vacuum pan, for example, and reducing the moisture content until the solids crystallize therefrom. This provides a crystalline or granular material which may be mixed, for example, with the bicarbonate of soda. The mixture can be packaged in dry form and in quantity sufficient to furnish a standardized charge for a fire-extinguisher. Aluminum sulphate can be packaged likewise and consequently the solutions can be prepared by merely adding the required amount of water to the contents of the packages.

While the extract is described more especially as a stabilizer for fire-extinguishing foam, it may be utilized advantageously for other purposes. I intend, therefore, to claim the product for all purposes to which it is adapted.

Various changes may be made in the details of the method of extraction as hereinbefore described without departing from the invention or sacrificing any of the advantages set forth.

I claim:

1. A foam stabilizer consisting of an extract of chestnut oak bark substantially free from tannin.

2. A foam stabilizer consisting of a secondary extract of chestnut oak bark.

3. A foam stabilizer for fire-extinguishing compositions and similar purposes consisting of the extract obtained by subjecting chestnut oak bark to the action of an alkaline solution.

4. A foam stabilizer for fire-extinguishing compositions and similar purposes consisting of a secondary extract obtained by subjecting chestnut oak bark to the action of an alkaline solution after a primary extraction with water.

5. A composition for use in extinguishing fires comprising a dry granular extract of chestnut oak bark combined with a gas releasing agent.

In testimony whereof I affix my signature.

NATHANIEL T. EWER.